United States Patent
Marupaduga et al.

(10) Patent No.: US 11,026,138 B1
(45) Date of Patent: Jun. 1, 2021

(54) DYNAMIC CONTROL OF MEASUREMENT THRESHOLD BASED ON INTER-BAND DUAL-CONNECTIVITY CAPABILITY

(71) Applicant: Sprint Spectrum L.P., Overland Park, KS (US)

(72) Inventors: Sreekar Marupaduga, Overland Park, KS (US); Vanil Parihar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/929,189

(22) Filed: Dec. 16, 2019

(51) Int. Cl.
| | |
|---|---|
| *H04W 36/08* | (2009.01) |
| *H04W 36/00* | (2009.01) |
| *H04W 36/06* | (2009.01) |
| *H04W 72/04* | (2009.01) |
| *H04W 36/30* | (2009.01) |

(52) U.S. Cl.
CPC ... *H04W 36/0094* (2013.01); *H04W 36/0069* (2018.08); *H04W 36/06* (2013.01); *H04W 36/08* (2013.01); *H04W 36/30* (2013.01); *H04W 72/0453* (2013.01)

(58) Field of Classification Search
CPC ......... H04W 36/0094; H04W 36/0069; H04W 36/06; H04W 36/08; H04W 72/0453
See application file for complete search history.

(56) References Cited

U.S. PATENT DOCUMENTS

| | | | |
|---|---|---|---|
| 6,763,234 B1 * | 7/2004 | Kabasawa | H04W 36/30 455/436 |
| 9,894,602 B1 | 2/2018 | Manchanda et al. | |
| 10,356,673 B2 | 7/2019 | Wong et al. | |
| 10,548,056 B1 | 1/2020 | Sung et al. | |
| 10,548,141 B1 | 1/2020 | Marupaduga et al. | |
| 2014/0328318 A1 | 11/2014 | Sundararajan et al. | |
| 2014/0329526 A1 | 11/2014 | Sundararajan et al. | |
| 2014/0341109 A1 | 11/2014 | Cartmell et al. | |
| 2014/0364123 A1 | 12/2014 | Shahidi et al. | |
| 2015/0289153 A1 | 10/2015 | Gopal et al. | |
| 2016/0174195 A1 | 6/2016 | Lee et al. | |
| 2016/0262188 A1 | 9/2016 | Zhang et al. | |
| 2016/0330660 A1 | 11/2016 | Wong et al. | |
| 2016/0360455 A1 | 12/2016 | Yang et al. | |
| 2016/0381615 A1 | 12/2016 | Nagaraja et al. | |
| 2017/0019819 A1 | 1/2017 | Yang et al. | |

(Continued)

*Primary Examiner* — Jinsong Hu
*Assistant Examiner* — Farideh Madani

(57) ABSTRACT

A mechanism for controlling a measurement threshold used for triggering handover of a user equipment device (UE) when the UE is connected with a first access node, the first access node operating on a first frequency band and a second frequency band, and a second access operating on the second frequency band. A determination is made as to whether the UE supports inter-band dual-connectivity service with the UE being connected with the first access node on the first band and with the second access node on the second band. And responsive to the determination being that the UE does not support the inter-band dual-connectivity service, the measurement threshold is adjusted from a default level to an adjusted level to help facilitate handover of the UE from being connected with the first access node on the first band to being connected with the first access node instead on the second band.

20 Claims, 4 Drawing Sheets

(56) References Cited

U.S. PATENT DOCUMENTS

| | | | |
|---|---|---|---|
| 2017/0332294 A1* | 11/2017 | Miyagoshi | H04W 36/36 |
| 2018/0098258 A1 | 4/2018 | Annam et al. | |
| 2019/0037417 A1 | 1/2019 | Lei et al. | |
| 2019/0260487 A1* | 8/2019 | Kazmi | H04L 5/0048 |

* cited by examiner

DYNAMIC CONTROL OF MEASUREMENT THRESHOLD BASED ON INTER-BAND DUAL-CONNECTIVITY CAPABILITY

BACKGROUND

A cellular wireless network typically includes a number of cell sites including access nodes that are configured to provide wireless coverage areas in which user equipment devices (UEs) such as cell phones, tablet computers, machine-type-communication devices, tracking devices, embedded wireless modules, and/or other wirelessly equipped communication devices (whether or not user operated) can operate. Further, each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide coverage on one or more carriers, each of which could be frequency division duplex (FDD), defining separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency.

Further, each such carrier could be defined within an industry specified frequency band, by its frequency channel(s) being defined within the frequency band. Without limitation, examples of such frequency bands include, without limitation, (i) Band 25, which supports FDD carriers and extends from 1850 MHz to 1915 MHz on the uplink and 1930 MHz to 1995 MHz on downlink, (ii) Band 26, which supports FDD carriers and extends from 814 MHz to 849 MHz on the uplink and 859 MHz to 894 MHz on the downlink, and (iii) Band 41, which supports TDD carriers and extends from 2496 MHz to 2690 MHz.

On the downlink and uplink channels, the air interface on each carrier could be configured in a specific manner to define physical resources for carrying information wirelessly between the access node and UEs.

In a non-limiting example implementation, for instance, the air interface on each carrier could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink of the example air interface could be grouped to define physical resource blocks (PRBs) that could be allocated as needed to carry data between the access node and served UEs.

In addition, certain resource elements on the example air interface could be reserved for special purposes. For instance, on the downlink, certain resource elements could be reserved to carry synchronization signals that indicate the presence of coverage on the carrier, other resource elements could be reserved to carry broadcast messages specifying system information, and still other resource elements could be reserved to carry a reference signal that UEs could measure in order to determine coverage strength.

OVERVIEW

When a UE enters into coverage of an example network, the UE could detect threshold strong coverage of an access node on a particular carrier (e.g., a threshold strong reference signal broadcast by the access node on that carrier) and could then engage in random-access and connection signaling, such as Radio Resource Control (RRC) signaling, to establish an RRC connection or the like through which the access node will then serve the UE on the carrier. Further, if the UE is not already registered for service with the core network, the UE could transmit to the access node an attach request, which the access node could forward to a core-network controller for processing. And the core-network controller and access node could then coordinate setup for the UE of one or more bearers extending between the UE and a core-network gateway that provides transport-network connectivity.

Once the UE is so connected and registered, the access node could then serve the UE in a connected mode on the carrier, managing downlink air-interface communication of packet data to the UE and uplink air-interface communication of packet data from the UE.

For example, with the air interface described above, when packet data for the UE arrives at the core network from a transport network, the data could flow to the UE's serving access node, and the access node could then schedule and provide transmission of that data to the UE on particular downlink PRBs of the carrier. Likewise, when the UE has data to transmit on the transport network, the UE could transmit a scheduling request to the access node, the access node could responsively schedule transmission of that data from the UE on particular uplink PRBs of the carrier, and the UE could accordingly transmit the data to the access node for forwarding through the core network to the transport network.

When the industry advances from one generation of wireless technology to the next, or in other scenarios, networks and UEs may also support dual-connectivity service, where a UE is served on co-existing connections according to multiple different RATs.

For instance, a cell site (or a combination of cell sites for that matter) could be equipped with a first access node that provides service according to a first RAT and a second access node that provides service according to a second RAT, and a UE positioned within coverage of the cell site could have a first radio configured to engage in service according to the first RAT and a second radio configured to engage in service according to the second RAT. With this arrangement, the UE may be able to establish a first-RAT connection with the first access node and a second-RAT connection with the second access node, and the access nodes may concurrently serve the UE over those connections.

Such dual-connectivity (or "non-standalone" connectivity) could help facilitate increased peak data rate of communications, by multiplexing the UE's communications across the multiple RAT connections. Further or alternatively, dual-connectivity may provide other benefits compared with serving a UE on a single connection according to a single RAT (as "standalone" connectivity).

In a representative dual-connectivity implementation, a cell site's first-RAT access node could function as a primary access node and anchor for signaling with the core network and RRC signaling with the UE, and the cell site's second-RAT access node could function as a secondary access node to provide added connectivity and bandwidth for the UE.

When a UE that supports dual-connectivity service enters into such a cell site, the UE could initially scan for and detect coverage of a primary access node (a first-RAT access node) on a first-RAT carrier and engage in signaling to establish a first-RAT connection between the UE and the primary access node on that carrier as discussed above. In turn, perhaps having determined from profile data that the UE is dual-connectivity-capable, the primary access node could then work with the core network, with the secondary access node (second-RAT access node), and with the UE, to establish a second-RAT connection between the UE and the secondary access node on a second-RAT carrier and to configure bearer connectivity for the UE via the secondary access node.

With these first-RAT and second-RAT connections so established for the UE, the primary and secondary access nodes could then serve the UE with packet-data communications on their respective connections with the UE, for instance with a portion of data flowing over the UE's first-RAT connection with the primary access node concurrently with another portion of the data flowing over the UE's second-RAT connection with the secondary access node.

One technical issue that can arise in a network that supports dual-connectivity is that the primary and secondary access nodes may provide respective service on different frequency bands than each other, but at least some UEs may be configured to support dual-connectivity only if within a common frequency band, i.e., only where the UE is served by the primary and secondary access nodes within the same frequency band.

This issue could arise, for example, in a scenario where the primary access node provides service on at least two frequency bands, A and B, and where the secondary access node provides service on band B but not on band A.

In that scenario, if a UE connects with the primary access node on band A and the UE supports intra-band dual-connectivity but not inter-band dual-connectivity, then the UE would be unable to receive dual-connectivity service from the primary and secondary access nodes unless and until the UE transitions from being served by the primary access node on band A to instead being served by the primary access node on band B. Whereas, if the UE connects with the primary access node on band B, then the UE could receive intra-band dual-connectivity service from the primary and second access nodes on band B.

From a user-experience standpoint, if the UE in that scenario connects with the primary access node on band B rather than on band A, then the UE may present an icon or other information indicating that the UE is within dual-connectivity-capable coverage, since the UE in that situation could receive dual-connectivity service from the primary and secondary access nodes on band B. A user of the UE could thus consider that icon or other information to be an indication that the network provides dual-connectivity at the UE's current location.

However, if the UE in that scenario connects with the primary access node on band A rather than on band B, then the UE may not present that icon or other information, since the UE in that situation would be unable to receive inter-band dual-connectivity service from the primary and secondary access nodes. But this could be a user-experience problem, as the user in that situation may consider the absence of that icon or other information to be an indication that the network does not provide dual-connectivity service at the UE's current location—even though the network could provide the UE with dual-connectivity service at that location if the UE would transition from being served by the primary access node on band A to being served by the primary access node on band B.

In an example implementation, a trigger for the UE transitioning from being served by the primary access node on band A to being served by the primary access node on band B may be the UE detecting and reporting one or more RF measurement events that would cause the primary access node to process that transition. For instance, the transition may occur only once the UE detects and reports to the primary serving access node that the UE's coverage from the primary serving access node on band B has become at least threshold strong and perhaps further that the UE's coverage from the primary serving access node on band A becomes at least threshold weak.

Unfortunately, however, the UE served by the primary access node on band A may not readily (if at all) detect and report such RF measurement event(s). Therefore, the UE may not present the icon or other information indicating that the UE is in dual-connectivity coverage, and the UE may not benefit from dual-connectivity service.

The present disclosure provides a mechanism to help address this technical problem.

In accordance with the disclosure, when a UE is connected with the primary access node on band A in a scenario like that above and the primary access node determines that the UE is dual-connectivity capable but that the UE does not support inter-band dual-connectivity, the primary access node will responsively adjust one or more measurement thresholds specifically for the UE, to help foster and expedite the UE's transition from being served by the primary access node on band A to being served by the primary access node on band B. By so adjusting the one or more measurement thresholds specifically for the UE, the primary access node could thereby help the UE to more easily and readily enter into a mode where the UE could receive intra-band dual-connectivity service, and the UE may therefore more readily present an icon or other information indicating that the UE is in dual-connectivity coverage.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

Figure 1:
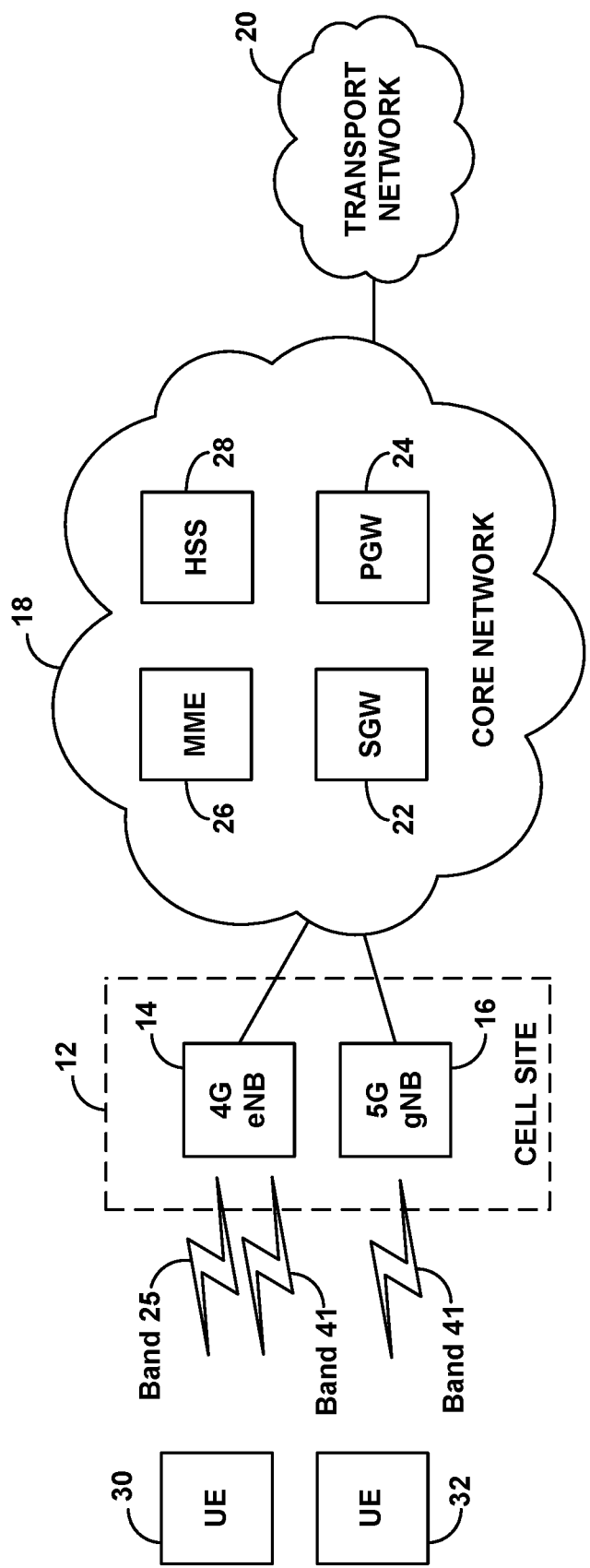
FIG. 1 is a simplified block diagram of an example wireless communication system in which various disclosed features can be implemented.

An example implementation will now be described in the context of 4G LTE, 5G NR, and 4G-5G dual connectivity, referred to as EUTRA-NR Dual Connectivity (EN-DC). With EN-DC, a 4G access node (4G evolved Node-B (eNB)) functions as the primary access node, and a 5G access node (5G next-generation Node-B (gNB)) functions as the secondary node. Thus, a UE would first establish a primary 4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE.

It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways.

As noted above, FIG. 1 is a simplified block diagram of an example wireless communication system in which various disclosed features can be implemented. In particular, the figure depicts a representative arrangement including an EN-DC-capable cell site 12 having a 4G eNB 14 that provides 4G coverage on at least two example 4G carriers, one in frequency band 25, and another in frequency band 41, and a 5G gNB 16 that provides 5G coverage on an example 5G carrier in frequency band 41. For simplicity, we can assume that the 4G coverage overlaps or is largely coterminous with the 5G coverage, so that a UE can operate concurrently in the 4G coverage and the 5G coverage.

In addition, each access node could also take various forms. For instance, an access node could be a macro access node of the type that would typically include a tower mounted antenna structure for providing a broad range of coverage. Or an access node could be a small cell access node, femtocell access node, relay access node, or other type of access node that might have a smaller form factor with an antenna structure that provides a narrower range of coverage. Further, access nodes might share an antenna tower and/or other equipment with each other. Other arrangements, including non-collocated access nodes, are possible as well.

Access nodes 14, 16 are each shown coupled with an example core network 18. Core network 18 could be an evolved packet core (EPC) network, a next generation core (NGC) network, or another network including components supporting an applicable radio access technology and providing connectivity with at least one transport network 20, such as the Internet.

In an example implementation as shown, the core network 18 includes a serving gateway (SGW) 22, a packet data network gateway (PGW) 24, a mobility management entity (MME) 26, and a home subscriber server (HSS) 28. Each access node 14, 16 could have an interface with the SGW and an interface with the MME, the MME could have an interface with the SGW and an interface with the HSS, the SGW could have an interface with the PGW, and the PGW could provide connectivity with the transport network.

With this arrangement, the SGW and PGW could cooperatively provide user-plane connectivity between each access node and the transport network, to enable a UE served by an access node to engage in communication on the transport network. Further, the MME could operate as a core-network controller to carry out operations such as coordinating UE attachment and setup of user-plane bearers. And the HSS could store UE profile records, which could specify service-subscription plans, UE configurations, and/or other such UE capability information.

As noted above, the air interface between each access node and UEs within its coverage could be structured to define various air-interface resources.

By way of example, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the access node operates could be divided into subcarriers with specified subcarrier spacing on the order of 15 to 240 kHz. With this example arrangement, the air interface on each carrier would define an array of resource elements each occupying a subcarrier and symbol time segment, and the access node and UEs could communicate with each other through modulation of the subcarriers to carry data in those resource elements. Variations of this arrangement are possible as well.

Further, particular sets of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the access node to UEs. And other resource elements per subframe could be reserved to define a shared channel in which PRBs could carry scheduled data communications from the access node to UEs.

Further, in certain subframes, a group of resource elements centered on the center frequency of each carrier could be reserved to carry synchronization signals that UEs could detect as a way to discover coverage of the access node on the carrier and to establish frame timing. And in certain subframes, a group of resource elements also centered on the center frequency of the carrier could be reserved to define a broadcast-channel for carrying system information messages, such as master information block (MIB) and system information block (SIB) messages that UEs could read to obtain operational parameters such as carrier bandwidth (e.g., downlink bandwidth and/or uplink bandwidth) and other information. Further, certain resource elements distributed in a predefined pattern throughout the carrier bandwidth per subframe could be reserved to carry reference signals that UEs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from UEs to the access node. And other resource elements per subframe could be reserved to define a shared channel in which PRBs could carry scheduled data communications from UEs to the access node. Further, still other resources on the uplink could be reserved for other purposes as well, such as for carrying uplink reference signals or the like.

Note also that the 4G air interface and 4G service provided by 4G eNB 14 on each 4G carrier could differ from the 5G air interface and 5G service provided by 5G gNB 16 on the 5G carrier in various ways now known or later developed. For example, one may provide variable subcarrier spacing, but the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

FIG. 1 also shows two representative UEs 30, 32, each within coverage of 4G eNB 14 and perhaps additionally within coverage of 5G gNB 16.

For present purposes, we could assume that each of these UEs 30, 32 supports 4G service, 5G service, and EN-DC service. For instance, each UE could include a 4G radio and associated RF circuitry for engaging in 4G service over a connection with 4G eNB 14 and a 5G radio and associated RF circuitry for engaging in 5G service over a connection with 5G gNB 16, and each UE could include control logic to enable the UE to engage in EN-DC service, operating concurrently with a 4G connection and a 5G connection.

Further, we could assume that each of the UEs 30, 32 supports intra-band EN-DC service but that only UE 32 supports inter-band EN-DC service. Thus, with the example bands noted above, UE 30 would support EN-DC service on a band-41 connection with the 4G eNB 14 and a band-41 connection with the 5G gNB 16, but UE 30 would not support EN-DC on a band-25 connection with the 4G eNB 14 and a band-41 connection with the 5G gNB 16. Whereas, UE 32 would support EN-DC service on a band-41 connection with the 4G eNB 14 and a band-41 connection with the 5G gNB 16, and UE 32 would also not support EN-DC on a band-25 connection with the 4G eNB 14 and a band-41 connection with the 5G gNB 16.

The HSS 28 may hold capabilities data for each of various UEs such as UEs 30, 32, indicating respectively for each UE whether the UE is EN-DC capable and, if so, whether the UE supports inter-band EN-DC (or rather that the UE supports just intra-band EN-DC). Thus, an HSS record for UE 30 could indicate that UE 30 is EN-DC capable and does not support inter-band EN-DC (i.e., just supports intra-band-EN-DC). And an HSS record for UE 32 could indicate that UE 32 is EN-DC capable and supports inter-band EN-DC (and intra-band EN-DC). In addition, the UEs themselves could be provisioned with such indications of their respective capabilities.

In general operation, when each such UE enters into coverage of the 4G eNB 14, the UE could detect coverage of the 4G eNB on a given one of 4G carriers and the UE could determine coverage strength from the 4G eNB on that carrier, such as reference signal receive strength (RSRP) or reference signal receive quality (RSRQ), among other possibilities. If the UE determines that that coverage is sufficiently strong, the UE could then engage in random access signaling and RRC configuration signaling with the 4G eNB as discussed above to connect with the 4G eNB on the carrier, thus putting the UE in an RRC-connected mode. Further, the 4G eNB could establish in data storage a context record for the UE and could store in the context record an identification of the UE's established RRC connection and an identification of the 4G carrier on which the UE is connected with the 4G eNB.

In addition, once the UE is connected with the 4G eNB, the UE could then transmit to the 4G eNB an attach request if appropriate, which the access node could forward to the MME for processing as discussed above. And after authenticating the UE, the MME could coordinate setup for the UE of one or more user-plane bearers. For instance, for each such bearer, the MME could engage in signaling with the 4G eNB and the SGW to set up for the UE an S1-U tunnel between the 4G eNB and the SGW, the SGW could responsively engage in signaling with the PGW to set up for the UE an S5 tunnel between the SGW and the PGW, and the 4G eNB could engage in signaling with the UE to set up for the UE a data radio bearer (DRB) between the UE and the eNB. Further, the 4G eNB could coordinate establishment for the UE of a corresponding data radio bearer between the UE and the 4G eNB, and the 4G eNB could record the operational state of the UE in the UE context record.

In relation to this attachment process or at another time, the 4G eNB could also obtain capabilities data regarding the UE and could store the capabilities data in the UE context record for reference while serving the UE. For instance, during the attachment process, the MME could obtain this data from the HSS and could covey the data to the 4G eNB for storage. Alternatively or additionally, the UE could provide the 4G eNB with a capabilities-report that conveys this data to the 4G eNB for storage.

As noted above, this capabilities data could indicate whether the UE is EN-DC capable and, if so, whether the UE supports inter-band EN-DC (or rather just supports intra-band EN-DC). For instance, the capabilities data could be set forth as a feature group indicator (FGI) bit string in which each bit is a Boolean indication of whether or not UE supports a corresponding feature.

One such bit could be an indication of whether the UE is EN-DC capable (e.g., based on whether the UE includes both 4G and 5G radios and associated logic and/or service subscription, among other possibilities), and another such bit could be an indication of whether the UE supports inter-band operation (e.g., concurrent operation on two or more bands, such as band 25 and band 41). For instance, having the EN-DC-capability bit be set to "1" could indicate that the UE is EN-DC capable, and having the EN-DC-capability bit be set to "0" could indicate that the UE is not EN-DC capable. And having the EN-DC-capability bit set to "1" and the inter-band-support bit set to "1" could indicate that the UE is EN-DC capable and supports inter-band EN-DC, whereas having the EN-DC-capability bit set to "1" and the inter-band-support bit set to "0" could indicate that the UE is EN-DC capable but does not support inter-band EN-DC.

Other bit arrangements, coding, or alternate mechanisms could be used to convey such UE capability data as well.

Once the UE is so connected with the 4G eNB on a particular carrier, the 4G eNB could then provide the UE with data communication service on that carrier as discussed above.

For instance, when data arrives at the 4G eNB for transmission to the UE, the 4G eNB could allocate one or more downlink PRBs in a subframe on the carrier for use to transmit at least a portion of the data, defining a transport block, to the UE. The 4G access node could then transmit to the UE in the control region of that subframe on the carrier a Downlink Control Information (DCI) message that designates the PRBs, and the 4G eNB could accordingly transmit the transport block to the UE in those designated PRBs on the carrier.

And when the UE has data to transmit to the 4G eNB (e.g., for transmission on the transport network), the UE could transmit to the 4G eNB on the carrier a scheduling request that carries with it a buffer status report (BSR) indicating how much data the UE has buffered for transmission. And in response, the 4G eNB could allocate one or more uplink PRBs in an upcoming subframe on the carrier for carrying a transport block of that data from the UE and could transmit to the UE on the carrier a DCI message that designates those upcoming PRBs. The UE could then accordingly transmit the transport block to the 4G eNB in the designated PRBs.

In an example implementation, UEs 30, 32 may each initially connect with the 4G eNB on the band-25 carrier. This could be a default mode of operation for the UEs. For instance, the UEs could be programmed to prefer operation on band 25 over operation on band 41. Therefore, each UE could initially search for 4G coverage on band 25 and may therefore each find coverage of the 4G eNB on band 25 and each initially connect with the 4G eNB on the band-25 carrier.

Further, while served by the 4G eNB on the band-25 carrier, each UE could also regularly monitor coverage strength and report to the 4G eNB when certain measurement thresholds are met, to facilitate possible handover of the UE to another carrier or perhaps to another 4G eNB. To facilitate this, for instance, the 4G eNB could broadcast and/or provide to each UE one or more measurement objects that specify what the UE is to measure and when the UE is to report to the 4G eNB.

One such measurement object could be an A2 measurement object that specifies a low-threshold for coverage strength (e.g., RSRP and/or RSRQ) from the 4G eNB on the band-25 carrier, such as coverage strength being at least as low as −105 dBm or another designated low value. Through regular measurements, the UE could thus determine when the UE's coverage strength from the 4G eNB on the band-25 carrier becomes at least as low as the specified threshold level. And when the UE detects that, the UE could responsively transmit to the 4G eNB an A2 measurement report indicating that that threshold is met.

Another such measurement object, which the 4G eNB might transmit to the UE upon receipt of an A2 measurement report for instance, could be an A4 measurement object that specifies a high threshold for coverage on the band-41 carrier or another cell for instance, such as coverage strength at least as high as −95 dBm or another designated high value. By measuring coverage on the band-41 carrier, the UE could thus determine when that coverage is at least as high as the specified threshold level. And when the UE detects that, the UE could responsively transmit to the 4G eNB an A4 measurement report indicating that that threshold is met.

Yet another such measurement object, which the 4G eNB might similarly transmit to the UE upon receipt of an A2 measurement report for instance, could be an A5 measurement object that specifies both a low threshold$_1$ for coverage strength from the 4G eNB on the band-25 carrier and a high threshold$_2$ coverage strength on target coverage such as from the 4G eNB on the band-41 carrier. By measuring coverage strength from the 4G eNB on the UE's serving band-25 carrier and also on the band-41 carrier, the UE could thus determine when the UE's serving coverage is at least as low as threshold$_1$ and coverage on the band-41 carrier is at least as high as threshold$_2$. And when the UE detects that those criteria are met, the UE could responsively transmit to the 4G eNB an A5 measurement report indicating that the criteria are met.

When the 4G eNB receives from the UE one or more measurement reports that establish a handover condition such as the UE having threshold poor coverage of the 4G eNB on the band-25 carrier and the UE having threshold strong coverage of the 4G eNB on the band-41 carrier, the 4G eNB may then responsively orchestrate a handover of the UE from the band-25 carrier to the band-25 carrier. For instance, the 4G eNB could transmit to the UE an RRC message that directs the UE to operate on the band-41 carrier rather than the band-25 carrier, and the 4G eNB could update the UE's context record accordingly. The 4G eNB could then proceed to serve the UE on the band-41 carrier.

As noted above, each such UE may be programmed to present an icon or other information indicating whether the UE is within EN-DC coverage—as an indication of whether the UE can engage in EN-DC service. With the development of 5G technology, for instance, the UE could present a "5G" icon whenever the UE is connected with a 4G eNB and could receive EN-DC service. (Here, the "5G" indication could connote not just that the UE can receive 5G NR service but that the UE can receive EN-DC service.)

Each UE could determine whether and when to present the "5G" icon based on whether the UE is within coverage of a 4G eNB that supports providing EN-DC service and further based on the UE's capabilities and a consideration of whether, given the band on which the UE is connected with the 4G eNB and given the band on which 5G NR service would be provided, the UE would support engaging in EN-DC service.

In an example implementation, the 4G eNB may broadcast a system message indicating that the 4G eNB is configured to support providing EN-DC service, so the UE could determine from that system message that the 4G eNB supports providing EN-DC service. Further, in an example network, 5G NR service may be provided by default on band 41, or the 4G eNB may also broadcast an indication that 5G NR service will be provided on band 41. Given this information, UE 30 and UE 32 could each decide whether to present the "5G" icon and could proceed accordingly.

As to UE 30, for instance, given knowledge that the 4G eNB supports providing EN-DC service and that 5G service would be provided on band 41, and given knowledge that UE 30 supports EN-DC but does not support inter-band EN-DC, UE 30 could present the "5G" icon if and when the UE is connected with the 4G eNB on a band-41 carrier, but UE 30 may not present the "5G" icon if and when UE 30 is connected with the 4G eNB on a band-25 carrier. As to UE 32, on the other hand, given knowledge that the 4G eNB supports providing EN-DC service, and given knowledge that UE 32 supports inter-band EN-DC, UE 32 may present the "5G" icon when UE 32 is connected with the 4G eNB on any band.

Based on the UE capability data, the 4G eNB could also control setup of EN-DC service per UE accordingly. For instance, if and when UE 30 is connected with the 4G eNB on a band-41 carrier, the 4G eNB could proceed to set up EN-DC service for UE 30 in which UE 30 would be served by the 4G eNB on band 41 and by the 5G gNB on band 41 as well. But if and when UE 30 is connected with the 4G eNB on a band-25 carrier, the 4G eNB could forgo setting up EN-DC service for UE 30, since UE 30 would not support inter-band EN-DC. Whereas, if and when UE 32 is connected with the 4G eNB on any band, the 4G eNB could proceed to set up inter-band or intra-band EN-DC service for UE 32.

The process of coordinating setup of EN-DC for a UE could involve signaling over an inter-access-node interface (e.g., an X2 interface) with the 5G eNB, and signaling with the UE to coordinate setup of a 5G connection between the UE and the 5G eNB. Further, the process could include working with the 5G gNB and perhaps with the MME, to coordinate setup for the UE of a split user-plane bearer so that a portion of the UE's user-plane communications could be served by the 4G eNB and another portion of the UE's user-plane communications could be served by the 5G gNB. This split bearer could be set up in various ways, such as (i) at the SGW, with one leg extending between the SGW and the 4G eNB and another leg extending between the SGW and the 5G gNB, (ii) at the 4G eNB, with the UE's 5G communications passing over an interface between the 4G and 5G access nodes, or (iii) at the 5G gNB, with the UE's 4G communications passing over an interface between the 4G and 5G access nodes.

Once EN-DC service is set up for UE 36, the 4G and 5G access nodes could then both serve UE 36 concurrently with packet-data communications. For instance, each access node could schedule and provide downlink data communication to the UE over its respective connection with the UE, and each access node could schedule and receive uplink communication from the UE over its respective connection with the UE. Alternatively, the UE's 4G and 5G connections might both support downlink scheduled communications to the UE but just one of those connections (perhaps just the 5G connection, or just the 4G connection) might support uplink scheduled communications from the UE. Regardless, in example EN-DC service, the UE would be concurrently connected with and served by the 4G eNB and the 5G gNB.

As noted above, the present disclosure provides a mechanism to help facilitate EN-DC service, by incentivizing inter-band handover of a UE and thus changing of the UE's anchor-carrier band in response to a determination that the UE is connected with the 4G eNB on a band that would preclude the UE from receiving EN-DC service. Namely, the disclosure provides for doing so at least in part by dynamically adjusting one or more measurement thresholds that govern whether and when a UE should hand over from one band to another.

As to UE 30 for instance, the 4G eNB could determine from UE capability data that the UE supports EN-DC but that the UE does not support inter-band EN-DC. And based at least on this determination, the 4G could dynamically set or adjust one or more measurement thresholds to make it easier for the UE to hand over from being connected with the 4G eNB on band 25 to being connected with the 4G eNB instead on band 41. For instance, the 4G eNB could increase the A2 threshold or the low A5 threshold$_1$ (e.g., by a few dBm or some other designated delta) so that the UE's coverage strength from the 4G eNB on band 25 could be deemed threshold low at a level higher than the default threshold. And/or the 4G eNB could decrease the A4 threshold or the high A5 threshold$_2$ (e.g., by a few dBm or some other designated delta) so that the UE's coverage strength from the 4G eNB on band 41 could be deemed threshold high at a level lower than the default threshold.

The 4G eNB could thus provide one or more such adjusted thresholds to UE 30, and UE 30 could responsively measure coverage strength and report accordingly. Provided with one or more such more-lenient thresholds, the UE could more readily provide one or more associated measurement reports to the 4G eNB, and the 4G eNB could more readily process handover of the UE from being connected with the 4G eNB on band 25 to being connected with the 4G eNB instead on band 41. Advantageously, the UE could thus more readily transition to a mode where the UE could receive EN-DC service, and the UE could thus more readily present the "5G" icon—thus possibly helping to improve user experience.

As to UE 32, on the other hand, the 4G eNB could determine from UE capability data that the UE supports inter-band EN-DC. And based at least on this determination, the 4G could forgo dynamically setting or adjusting one or more measurement thresholds to make it easier for the UE to hand over from being connected with the 4G eNB on band 25 to being connected with the 4G eNB instead on band 41. Rather, here the 4G eNB could provide and apply the default one or more measurement thresholds. And the UE may hand over from band 25 to band 41 only if and when the default one or more measurement threshold are met, which is fine, as the UE can operate with EN-DC service regardless of the UE's anchor carrier band.

Note that the above process can apply also if the 4G eNB serves a UE with carrier-aggregation service on a combination of multiple 4G carriers. In that case, the 4G carrier at issue could be the primary component carrier (or primary cell (PCell)) of the UE's carrier-aggregation service.

Further, note that the act of adjusting a measurement threshold could be done effectively in a given instance by biasing or causing a UE's measurement of coverage strength to be biased accordingly. For instance, the act of increasing by a particular delta a low-threshold for coverage strength to a higher value could be effectively achieved in practice by biasing downward by that delta the UE's measurement of coverage strength. And the act of decreasing by a delta a high-threshold for coverage strength to a lower value could be effectively achieved in practice by biasing upward by that delta the UE's measurement of coverage strength. Other implementations could also be possible.

Figure 2:
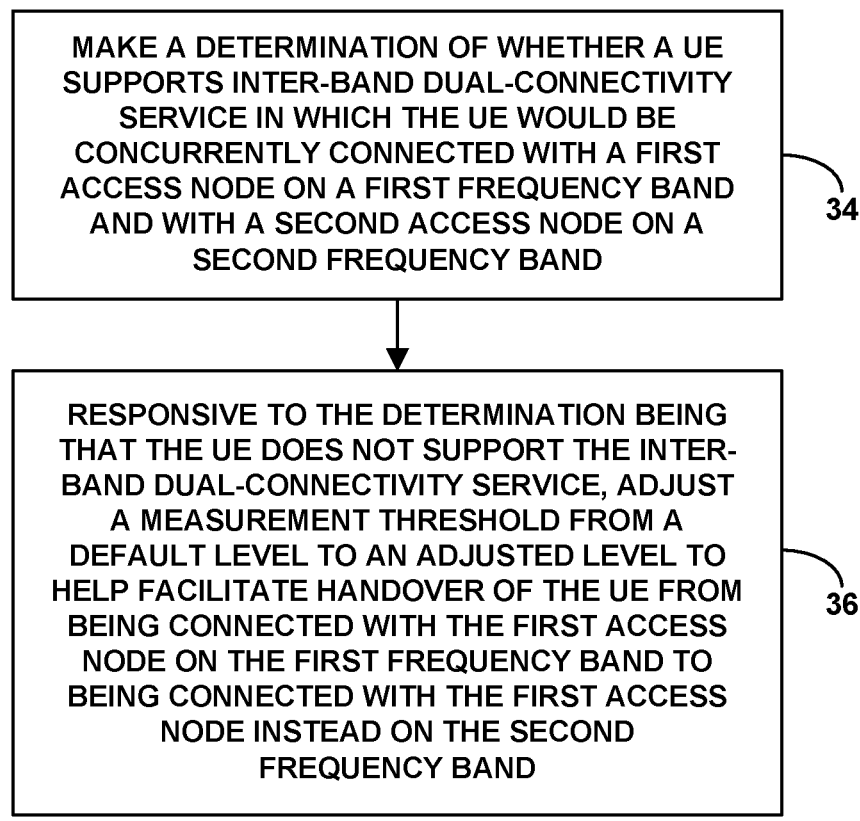
FIG. 2 is a flow chart depicting an example method in accordance with the present disclosure.

FIG. 2 is a flow chart depicting a method that can be carried out in accordance with the present disclosure to control a measurement threshold used for triggering handover of a UE when the UE is connected with a first access node, in a system where the first access node provides service on a first frequency band and on a second frequency band and where a second access node provides service on the second frequency band (e.g., and not on the first frequency band). This method could be carried out by or on behalf of the first access node, among other possibilities.

As shown in FIG. 2, at block 34, the method includes making a determination of whether the UE supports inter-band dual-connectivity service in which the UE would be concurrently connected with the first access node on the first frequency band and with the second access node on the second frequency band. And at block 36, the method includes, responsive to the determination being that the UE does not support the inter-band dual-connectivity service (though the UE supports intra-band dual-connectivity service), adjusting the measurement threshold from a default level to an adjusted level to help facilitate handover of the UE from being connected with the first access node on the first frequency band to being connected with the first access node instead on the second frequency band.

In line with the discussion above, the measurement threshold at issue in this method could be a threshold-low coverage strength from the first access node on the first band (such that the threshold would be met if and when the UE's coverage strength from the first access node on the first band is at least that low), in which case the adjusted level could higher than the default level. Or the measurement threshold at issue could be a threshold-high coverage strength from the first access node on the second band (such that the threshold would be met if and when the UE's coverage strength from the first access node on the second band is at least that high), in which case the adjusted level could be lower than the default level.

Further, as discussed above, the act of making the determination of whether the UE supports the inter-band dual-connectivity service could involve, based on capability data of the UE, (i) determining that the UE supports dual-connectivity service and (ii) determining whether the UE supports inter-band dual-connectivity service. And the act of making the determination of whether the UE supports the inter-band dual-connectivity service could occur responsive to at least determining that the first frequency band on which the UE is connected with the first access node is different than the second frequency band on which the second access node provides service.

Still further, as discussed above, the method could be carried out in a system in which the first and second access nodes are collocated (e.g., in a common cell site). And as noted above, the inter-band dual-connectivity service could involve the UE being served by the first access node in accordance with a first RAT concurrently with the UE being served by the second access node in accordance with a second RAT. Here, for instance, the first RAT could be 4G LTE, the second RAT could be 5G NR, and the dual-connectivity could be EN-DC.

Figure 3:
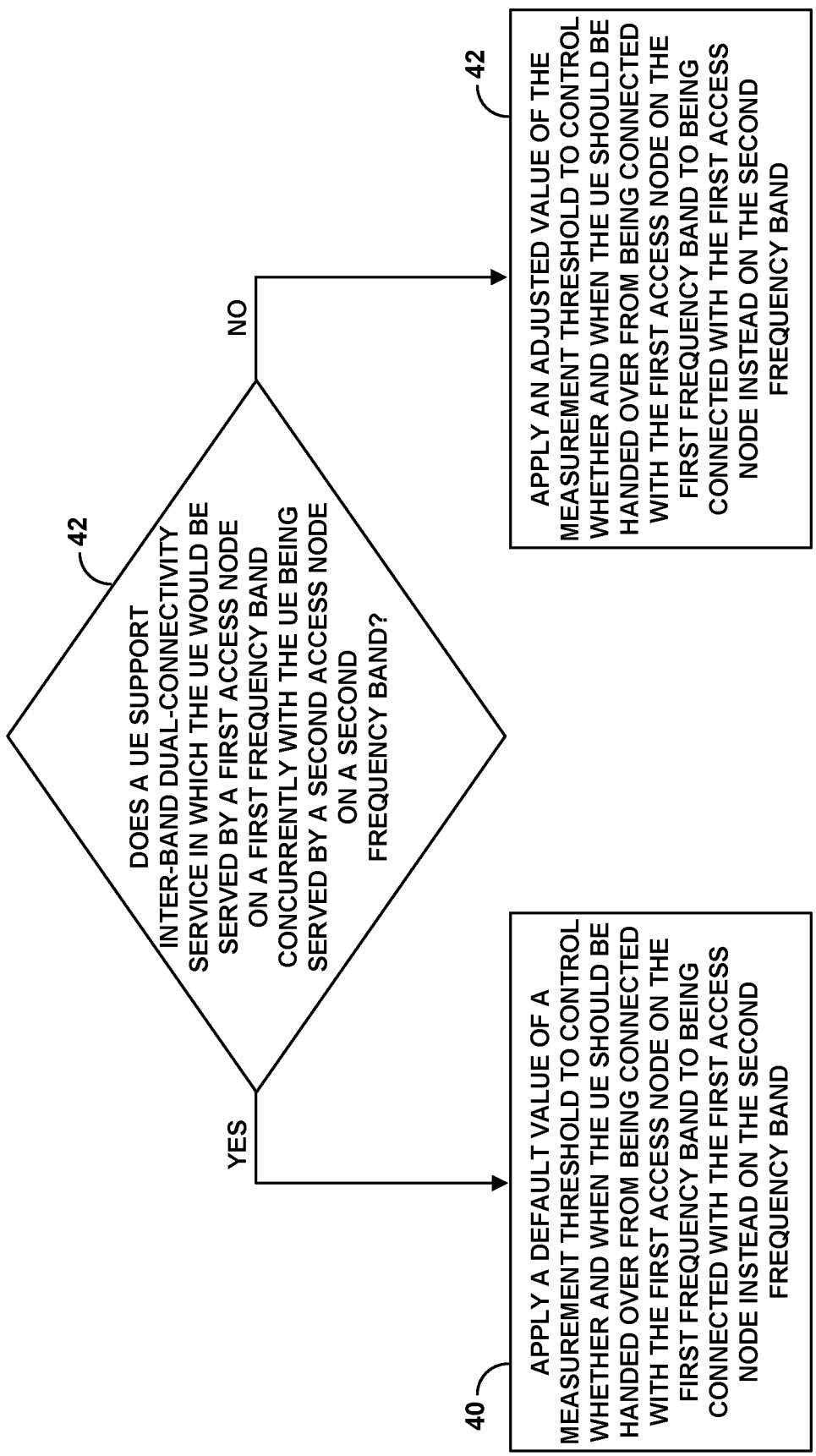
FIG. 3 is another flow chart depicting an example method in accordance with the present disclosure.

FIG. 3 is a flow chart depicting a method that can be carried out in accordance with the present disclosure to help facilitate dual-connectivity service of a UE. This method can similarly be carried out by or on behalf of a first access node, among other possibilities.

As shown in FIG. 3, at block 38, the method includes making a determination of whether the UE supports inter-band dual-connectivity service in which the UE would be served by the first access node on a first frequency band concurrently with the UE being served by a second access node on a second frequency band. Further, at block 40, the method includes, if the determination is that the UE supports the inter-band dual-connectivity service, then applying a default value of a measurement threshold to control whether and when the UE should be handed over from being connected with the first access node on the first frequency band to being connected with the first access node instead on the second frequency band. Whereas, at block 42, the method includes, if the determination is that the UE does not support the inter-band dual-connectivity service, then instead applying an adjusted value of the measurement threshold to control whether and when the UE should be handed over from being connected with the first access node on the first frequency band to being connected with the first access node instead on the second frequency band.

Various features discussed above can be implemented in this context as well, and vice versa. For instance, the measurement threshold could be a threshold-low coverage strength from the first access node on the first band, in which case the adjusted value could be higher than the default value. Or the measurement threshold could be a threshold-high coverage strength from the first access node on the second band, in which case the adjusted value could be lower than the default value.

Figure 4:
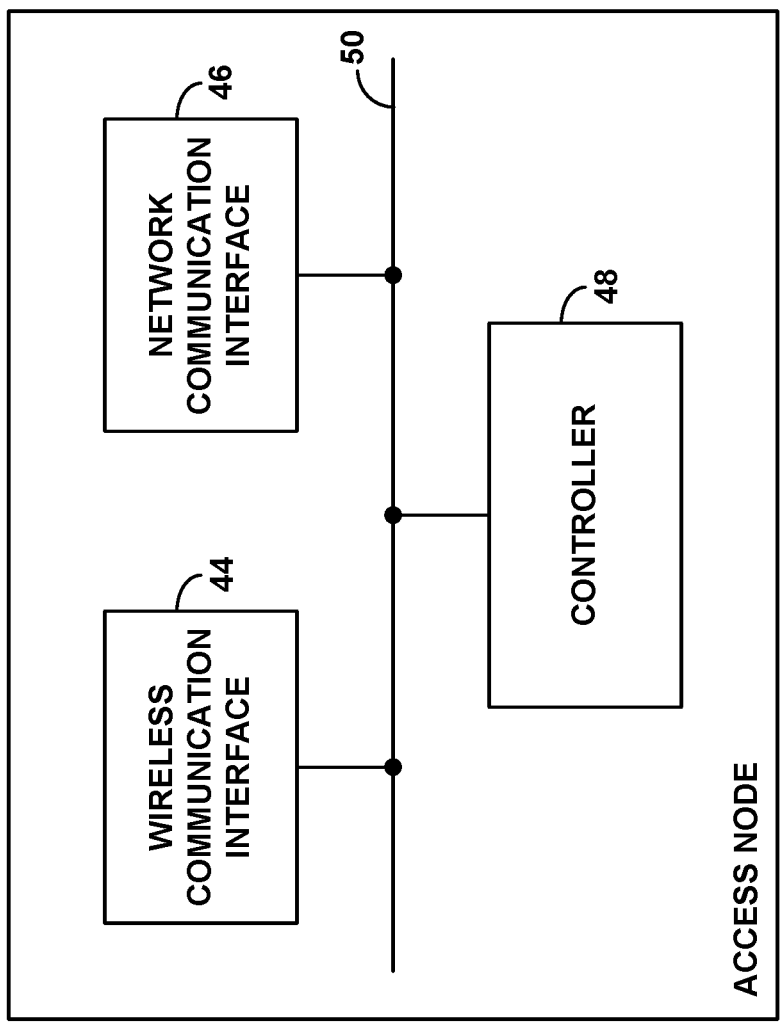
FIG. 4 is a simplified block diagram of an example access node operable in accordance with the present disclosure.

Finally, FIG. 4 is a simplified block diagram of an example first access node that could be configured in accordance with the present disclosure to control a measurement threshold used for triggering handover of a UE when the UE is connected with a first access node in a communication system in which the first access node provides service on a first frequency band and on a second frequency band and in which a second access node provides service on the second frequency band.

As shown, the example first access node includes a wireless communication interface 44, a network communication interface 46, and a controller 48, all of which could be integrated together and/or communicatively linked together by a system bus, network, or other connection mechanism 50.

In this example arrangement, the wireless communication interface 44 (which might comprise multiple separate wireless communication interfaces or an integrated interface) could be configured to provide cellular coverage and service on both the first band and the second band. As such, the wireless communication interface 44 could comprise an antenna structure, which could be tower mounted or could take other forms, and associated components such as a power amplifier and a wireless transceiver, to facilitate operation as described above. Further, network communication interface 46 could comprise a wired or wireless interface, such as an Ethernet network communication interface, configured to support communication with other entities, such as entities core network 18.

Controller 48 could then comprise control logic to cause the first access node to carry out particular operations including those discussed above. As such, the controller 48 could take various forms, including but not limited to a processing unit including one or more processors (e.g., general purpose microprocessors and/or dedicated processing units) and non-transitory data storage (e.g., one or more volatile and/or non-volatile storage components, such as magnetic, optical, or flash storage) holding, storing, encoded with, or otherwise embodying or having program instructions executable by the processing unit to cause the first access node to carry out various operations described herein. It should also be understood that the present disclosure contemplates a non-transitory computer readable medium holding, storing, encoded with, or otherwise embodying or having program instructions executable to carry out such operations as well.

Various features described above can be applied in this context as well, and vice versa.

Exemplary embodiments have been described above. Those skilled in the art will understand, however, that changes and modifications may be made to these embodiments without departing from the true scope and spirit of the invention.

We claim:

1. A method for controlling a measurement threshold used for triggering handover of a user equipment device (UE)

when the UE is connected with a first access node, wherein the first access node provides service on a first frequency band and on a second frequency band, and wherein a second access node provides service on the second frequency band, the method comprising:
  making a determination of whether the UE supports inter-band dual-connectivity service in which the UE would be concurrently connected with the first access node on the first frequency band and with the second access node on the second frequency band; and
  responsive to the determination being that the UE does not support the inter-band dual-connectivity service, adjusting the measurement threshold from a default level to an adjusted level to help facilitate handover of the UE from being connected with the first access node on the first frequency band to being connected with the first access node instead on the second frequency band.

2. The method of claim 1, wherein the method is carried out by the first access node.

3. The method of claim 1, wherein the measurement threshold is a threshold-low coverage strength from the first access node on the first frequency band, and wherein the adjusted level is higher than the default level.

4. The method of claim 1, wherein the measurement threshold is a threshold-high coverage strength from the first access node on the second frequency band, and wherein the adjusted level is lower than the default level.

5. The method of claim 1, wherein making the determination of whether the UE supports the inter-band dual-connectivity service comprises, based on capability data of the UE, (i) determining that the UE supports dual-connectivity service and (ii) determining whether the UE supports inter-band dual-connectivity service.

6. The method of claim 1, wherein the making of the determination of whether the UE supports the inter-band dual-connectivity service occurs responsive to at least determining that the first frequency band on which the UE is connected with the first access node is different than the second frequency band on which the second access node provides service.

7. The method of claim 1,
  wherein the first and second access nodes are collocated, and
  wherein the inter-band dual-connectivity service involves the UE being served by the first access node in accordance with a first radio access technology (RAT) concurrently with the UE being served by the second access node in accordance with a second RAT.

8. The method of claim 7, wherein the first RAT is 4G LTE, the second RAT is 5G NR, and the dual-connectivity is EUTRA-NR Dual Connectivity (EN-DC).

9. A method to facilitate dual-connectivity service of a user equipment device (UE), the method comprising:
  making a determination of whether the UE supports inter-band dual-connectivity service in which the UE would be served by a first access node on a first frequency band concurrently with the UE being served by a second access node on a second frequency band; and
  based on the determination, controlling what value of a measurement threshold to apply for controlling whether and when the UE should be handed over from being connected with the first access node on the first frequency band to being connected with the first access node instead on the second frequency band, including:
    (i) if the determination is that the UE supports the inter-band dual-connectivity service, then applying a default value of the measurement threshold to control whether and when the UE should be handed over from being connected with the first access node on the first frequency band to being connected with the first access node instead on the second frequency band, and
    (ii) if the determination is that the UE does not support the inter-band dual-connectivity service, then instead applying an adjusted value of the measurement threshold to control whether and when the UE should be handed over from being connected with the first access node on the first frequency band to being connected with the first access node instead on the second frequency band.

10. The method of claim 9, wherein the method is carried out by the first access node.

11. The method of claim 9, wherein the measurement threshold is a threshold-low coverage strength from the first access node on the first frequency band, and wherein the adjusted value is higher than the default value.

12. The method of claim 9, wherein the measurement threshold is a threshold-high coverage strength from the first access node on the second frequency band, and wherein the adjusted value is lower than the default value.

13. The method of claim 9, wherein making the determination of whether the UE supports the inter-band dual-connectivity service comprises, based on capability data of the UE, (i) determining that the UE supports dual-connectivity service and (ii) determining whether the UE supports inter-band dual-connectivity service.

14. A first access node configured to control a measurement threshold used for triggering handover of a user equipment device (UE) when the UE is connected with a first access node in a communication system in which the first access node provides service on a first frequency band and on a second frequency band and in which a second access node provides service on the second frequency band, the first access node comprising:
  a wireless communication interface through which the first access node is configured to provide the service on the first frequency band and on the second frequency band;
  a network communication interface though which the first access node is configured to communicate on a core network; and
  a controller for controlling the measurement threshold by carrying out operations including:
    making a determination of whether the UE supports inter-band dual-connectivity service in which the UE would be concurrently connected with the first access node on the first frequency band and the second access node on the second frequency band, and
    responsive to the determination being that the UE does not support the inter-band dual-connectivity service, adjusting the measurement threshold from a default level to an adjusted level to help facilitate handover of the UE from being connected with the first access node on the first frequency band to being connected with the first access node instead on the second frequency band.

15. The first access node of claim 14, wherein the controller comprises a processing unit, non-transitory data storage, and program instructions stored in the non-transitory data storage and executable by the processing unit to carry out the operations.

16. The first access node of claim 14, wherein the measurement threshold is a threshold-low coverage strength from the first access node on the first frequency band, and wherein the adjusted level is higher than the default level.

17. The first access node of claim 14, wherein the measurement threshold is a threshold-high coverage strength from the first access node on the second frequency band, and wherein the adjusted level is lower than the default level.

18. The first access node of claim 14, wherein making the determination of whether the UE supports the inter-band dual-connectivity service comprises, based on capability data of the UE, (i) determining that the UE supports dual-connectivity service and (ii) determining whether the UE supports inter-band dual-connectivity service.

19. The first access node of claim 14, wherein the making of the determination of whether the UE supports the inter-band dual-connectivity service occurs responsive to at least the first access node determining that the first frequency band on which the UE is connected with the first access node is different than the second frequency band on which the second access node provides service.

20. The first access node of claim 14, wherein the inter-band dual-connectivity service involves the UE being served by the first access node in accordance with a first radio access technology (RAT) concurrently with the UE being served by the second access node in accordance with a second RAT.

* * * * *